United States Patent
Robinson et al.

(10) Patent No.: US 9,846,086 B1
(45) Date of Patent: Dec. 19, 2017

(54) SYSTEM AND METHOD FOR TIME-TEMPERATURE MONITORING OF TRANSPORTABLE GOODS

(71) Applicants: Thomas A. Robinson, Mendham, NJ (US); Herbert Perten, Suffern, NY (US); David Gsell, Radnor, PA (US)

(72) Inventors: Thomas A. Robinson, Mendham, NJ (US); Herbert Perten, Suffern, NY (US); David Gsell, Radnor, PA (US)

(73) Assignee: STARTRAK SYSTEMS LLC, Rochelle Park, NJ (US)

( * ) Notice: Subject to any disclaimer, the term of this patent is extended or adjusted under 35 U.S.C. 154(b) by 370 days.

(21) Appl. No.: 14/076,904

(22) Filed: Nov. 11, 2013

Related U.S. Application Data

(63) Continuation of application No. 61/724,671, filed on Nov. 9, 2012.

(51) Int. Cl.
*G01K 3/04* (2006.01)
*G01K 7/42* (2006.01)
*G01K 11/06* (2006.01)

(52) U.S. Cl.
CPC .............. *G01K 3/04* (2013.01); *G01K 7/42* (2013.01); *G01K 11/06* (2013.01)

(58) Field of Classification Search
CPC ............. G01K 11/06; G01K 3/02; G01K 7/42
USPC ................................ 374/102, 103, 101, 107
See application file for complete search history.

(56) References Cited

U.S. PATENT DOCUMENTS

| | | | | |
|---|---|---|---|---|
| 5,262,758 | A * | 11/1993 | Nam ........................ | G01K 1/02 340/585 |
| 7,396,157 | B2 * | 7/2008 | Liao ...................... | G01K 13/002 340/539.1 |
| 8,390,464 | B1 | 3/2013 | Slifkin et al. | |
| 9,470,587 | B1 * | 10/2016 | Greene ................ | G01K 15/005 |
| 2006/0224349 | A1 * | 10/2006 | Butterfield ............... | G01K 7/42 702/130 |
| 2009/0228155 | A1 * | 9/2009 | Slifkin .................. | F25D 29/003 700/299 |
| 2015/0233847 | A1 * | 8/2015 | Hogan ................... | G01N 25/00 374/134 |

* cited by examiner

*Primary Examiner* — Lisa Caputo
*Assistant Examiner* — Nathaniel T Woodward
(74) *Attorney, Agent, or Firm* — Drinker Biddle & Reath LLP

(57) ABSTRACT

A method and related system for monitoring a time-temperature profile comprises measuring by a temperature sensor a temperature of an object, recording by an electronic device a time-temperature data point including the temperature and a time at which the temperature was measured, communicating the recorded time-temperature data point by the electronic device to a computing system, and determining by the computing system whether the recorded time-temperature data point is outside a predetermined acceptable range.

7 Claims, 8 Drawing Sheets

| Shipment Cycle State (SCS) | SCS Description | Temperature State (TS) | TS Description |
|---|---|---|---|
| Storage | Food/drugs that are at the production, processing or storage site (storage site) ready for shipment | Facility | Air temperature of the facility, where commodities are stored |
| Pulled | Commodity is pulled, prepared and palletized at the storage site for shipment | Pulled | Air temperature or core temperature of the commodity (depending on user preference). Shipment is initiated. |
| Ordered | Palletized commodity is assigned to either an order or transportation asset. | Assigned | Core temperature of the commodity (configured per Figure 9). |
| Staged | Palletized commodity is staged on a loading dock near a transportation asset. | Staged | Core temperature of the commodity (configured per Figure 9). |
| Loaded | Palletized commodity is loaded and perhaps combined with additional pallets in a transportation asset. | Loading | Core temperature of the commodities. |
| Transported | Commodity is in-transit on a transportation asset | In-Transit | Time-temperature profile of core product. |
| Unloaded | All or a portion of the shipment is being unloaded from the asset. The door is likely open. | Unloading | Core temperature of the commodity. |
| Delivery | All or a portion of the shipment is removed from the asset and placed in a delivery facility | Delivery | Core temperature of the commodity |
| Delivered | All or a portion of the shipment is provided to a third party, responsible for the commodity | Delivered | Core time-temperature of the commodity is terminated. |

FIG. 9

SYSTEM AND METHOD FOR TIME-TEMPERATURE MONITORING OF TRANSPORTABLE GOODS

CROSS REFERENCE TO RELATED APPLICATIONS

The present application claims the benefit of U.S. Provisional Application No. 61/724,671, filed Nov. 9, 2012, entitled, "System and Method for Time-Temperature Monitoring of Transportable Goods", herein incorporated by reference.

SUMMARY

With the expansion and growth of global sourcing in the supply chain, more prevalent interest has been placed on automatic electronic time and temperature monitoring to increase food and drug safety and improve food defense systems throughout all areas of production, processing, storage and transportation and operations. Automatic electronic time-temperature monitoring systems may be used to reduce reliance on labor-based monitoring systems, which is expensive and prone to error.

For many goods, products, and commodities (interchangeably referred to herein with the understanding that the embodiments are equally applicable to any of these and other similar and/or related objects), proper handling requires refrigerated, heated, or temperature controlled facilities and transportation equipment, to assure shelf quality, longevity, and safety. Automatic temperature monitoring devices allow operators and supervisors to identify the time-temperature conditions of a commodity so that an educated evaluation of the commodity's compliance with safety and standards are achieved.

In the area of storage and transportation of food and drug commodities, for example, the need for accurate, provable and auditable time-temperature monitoring has increased as developed nations have called for increasing regulations for food safety, temperature compliance, and food defense since the mad cow disease scare at the turn of the twentieth century. Whereas in the not-too-distant past it was acceptable to rely on the various transportation operators to certify time-temperature compliance, best practices today call for independent electronic time-temperature monitoring devices to accompany a commodity in the storage areas and through the transportation and delivery process.

Cost and reliability efficiencies may be realized by facilitating the time-temperature monitoring to be delivered as accurately as possible and in real time. Particularly with respect to storage and transportation delivery operations, accurate time-temperature monitoring is difficult in real time as temperatures of a commodity in a warehouse have reached equilibrium with temperature sensors within the facility; however, in the transition to a refrigerated trailer, for example, temperature probes in the trailer may only measure temperatures of the air in the trailer instead of the core commodity temperature. This phenomenon may create areas of time-temperature discontinuity between storage, transportation, and delivery facilities and equipment, creating uncertainty regarding the temperature quality of the shipment and direct assignment of responsibility for deviations from a specified or acceptable temperature quality.

Embodiments discussed herein include an enhanced method of automated, electronic, real-time time-temperature monitoring of transportable goods, for example, refrigerated food and drug commodities. The method efficiently transitions from storage (e.g., warehouse) to transportation asset (e.g., refrigerated container, trailer, railcar, or truck) to delivery. Embodiments discussed herein also include a system that performs the disclosed method. In addition, the disclosed method facilitates improvements to systemic monitoring that were heretofore not realizable. While the embodiments discussed herein relate to food and drug storage and transportation, this should not be construed as limiting. Embodiments may also be applied to storage and transportation of goods, products, and commodities in general, from the supplier of raw materials, to the manufacturer, to the retailer, to the consumer, and any other participants in the value chain.

In order to reduce dependence on human labor, the food and drug storage and transportation industry has adopted the widespread use of electronic temperature recording devices that are placed in pallets of commodities throughout the storage, transportation, and delivery cycle. These devices record the time-temperature relationship of the commodities, and are retrieved after delivery for a download of the data. The difficulties with these devices include that they are prone to human error by setting the improper set point, and that the time-temperature result may demonstrate a spoiled commodity after the commodity had already become spoiled, whereas the problem may have been prevented in the delivery cycle if the information had been available earlier.

Data collected from these devices are also cumbersome to access and analyze, and in today's state of the art supply chain cycle, commodities may be consumed before the data is analyzed. These systems also may be delivered in a wireless communications version; however, flexible applications using this method are difficult to achieve due to dependence of power on batteries, without a readily available power source. Thus, these probes are subject to loss as they must be retrieved from the commodity at shipment and must be recharged and recycled for the subsequent load.

Subsequent wireless systems have been developed which include sensors that monitor the time-temperature relationship of the air flow in the transportation asset (e.g., refrigerated container, trailer, railcar, or truck), among other sensors. These systems have been enhanced with installed temperature probes which allow for close time-temperature monitoring in the proximity of the commodity or pallet, accounting for any temperature variations within the temperature sensors within the trailer.

These systems have provided real-time time-temperature monitoring which allows for prevention of problems and instant assessment of transportation cycle temperature quality; however, these systems do not account for the monitoring of the commodity into and out of the transportation asset and may exhibit time-temperature inaccuracies if the air temperature in the trailer is significantly different than that of the commodity when the commodity is loaded into the transportation asset. For instance, if a commodity is left for a lengthy period of time on a hot loading dock, and the commodity is loaded into a refrigerated asset equipped with an automatic electronic real-time monitoring system, the data output would not reflect an accurate time-temperature condition of the commodity. These systems are also prone to human error when the temperature probes are inconsistently placed among commodities and pallets.

Further difficulties exist in the real-time time-temperature monitoring of commodities. A package of commodities may reach temperature equilibrium with its temperature environment eventually, but proper monitoring of the commodity should address its "core" temperature for a full understanding of the time-temperature history of the commodity. For instance, if a "cold" commodity from a storage facility is loaded into a "hot" refrigerated asset, the time-temperature relationship of the "air" temperature in the asset is not representative of the commodity's time-temperature history. Because of the specific heat of the commodity, the commodity may retain its cold temperature for a lengthy period of time; however, as refrigeration in the asset is applied, the "air" temperature may demonstrate wide variations, significantly wider than those of the commodity itself. Further, if a door of a refrigerated asset is left open for a lengthy time period on a hot day as the commodity is being delivered, monitoring air temperatures as opposed to core commodity temperatures would provide an erroneous result because the air temperatures would rise much faster than the commodity's core temperature. Therefore, proper time-temperature monitoring within a storage, transportation, and delivery process should take into account core commodity temperatures in the transition areas of the storage, transportation, and delivery process.

Embodiments are generally directed to real-time time-temperature monitoring systems, which accommodate the distribution process of a commodity from a growing, processing, or storage facility, via a transportation process through delivery to grocery stores, food markets, restaurants, pharmacies, hospitals, or other retail facilities and end-use locations. Embodiments also provide a focused temperature application for the food service market, with an eye toward emerging temperature regulations (e.g., Food and Drug Administration (FDA) Food Safety Modernization Act (FMSA)). Embodiments may include an intelligent wireless device on a temperature-regulated (e.g., refrigerated or heated) transportation asset as a mechanism to deliver real-time time-temperature conditions of the commodity. The wireless device may be extended via the use of wireless specialized temperature sensors and methodologies which provide for accurate time-temperature monitoring through the shipment cycle. Wireless temperature probes may be remotely electronically programmable to monitor core commodity temperatures on a continuous basis for flexible and broad use. The embodiments may include:

- Simulated product temperature being conducted electronically, as opposed to using probes immersed in glycol solutions. This provides temperature monitoring of core product temperature without the spiking effects of air temperature.
- The simulated product temperature probe may be either wireless or tethered (e.g., a: re-charged by REEFERTRAK® upon reconnection to a location within each trailer or b: via an independent charging station. REEFERTRAK® is a commercial tracking and real-time monitoring system for refrigerated transportation solutions.)
- The simulated product temperature electronics may be altered via remote communications by identification of the product and its volume. For instance, a certain load size of broccoli would create the calculation of a specific heat calculation, leading to the proper core product vs. air temperature calculation. This could be performed on every load or averaged for shipments which contain mixed amounts of different products.
- The simulated product temperature probe may operate in wireless fashion in the warehouse and yet operate simultaneously as an integrated part of REEFERTRAK® or REEFERTRAK® MARINER when the product is loaded into the refrigerated transportation asset (e.g., refrigerated trailer).
- The probes may be auto registered via the aid of a portable or handheld computing device such as a personal digital assistant (PDA) (e.g., via a search/add function) or bar code reader (associated) to any REEFERTRAK® equipped trailer.
- The probes may be auto registered to an order via a bar code. The order, in turn, may be associated to REEFERTRAK® via dispatch, where the probe-trailer mounted system is associated.
- Trailer association of the load/commodity order at the dock may be used to associate the probe/order to the trailer number.

BRIEF DESCRIPTION OF THE DRAWINGS

FIG. 9 is a table that illustrates sequential shipment cycle "states" for temperature controlled commodities within the storage, transportation and delivery segment, according to an embodiment.

DETAILED DESCRIPTION

Independent and automatic time-temperature monitoring of commodities taken from shipping pallets is ideally done by the insertion of a sensing probe all the way into the heart of the shipping pallet. This is difficult to implement in practice because pallets are typically built up without a mechanism of inserting temperature probes to their cores. An alternative is to sense the temperature of the outer layer of the pallet, and assume that the core is at a similar temperature. Risks in putting any probe directly in the pallet include that it will be forgotten during loading or unloading of the pallet and will get damaged or lost. Therefore, it is common practice to mount independent temperature probes to the walls of the trailers or containers close to the pallets whose time-temperature profiles are desired to be monitored.

To eliminate the variation of "air" temperatures relative to "core" commodity temperatures, one solution has been to immerse temperature probes into "Gel packs" or "glycol solutions," which better simulate core commodity temperatures. Although this system provides simulated commodity time-temperature monitoring and delivers more acceptable results than simply measuring the time-temperature profile of the outer layer of the pallet, this system is not an accurate method of measuring the time-temperature environment of disparate commodities throughout the shipment cycle.

Economical temperature probes in use today in the food and drug storage and transportation industry are based either on thermocouples or resistance (RTD) elements. The actual sensing elements are of low thermal mass and therefore typically respond within milliseconds or seconds to the air temperature around them. However, the transported commodity for which they are providing time-temperature monitoring in real time may have a thermal time constant measured in hours. Short term changes in ambient temperature, such as occur when opening and closing doors, may have little impact on the core temperature of a pallet.

In an attempt to slow down the response time of the temperature sensors and better simulate the impact of thermal mass and resistance on a commodity's core temperature, one solution in common practice is to insert the temperature sensors in vials of ethylene glycol. Thus, they no longer measure the air temperature directly, but are actually measuring the temperature as moderated by the ethylene glycol, whose thermal mass and resistance causes it to change temperature more slowly. Various substances and vial sizes may be used in attempts to better match the response of a given shipping pallet.

Figure 1:
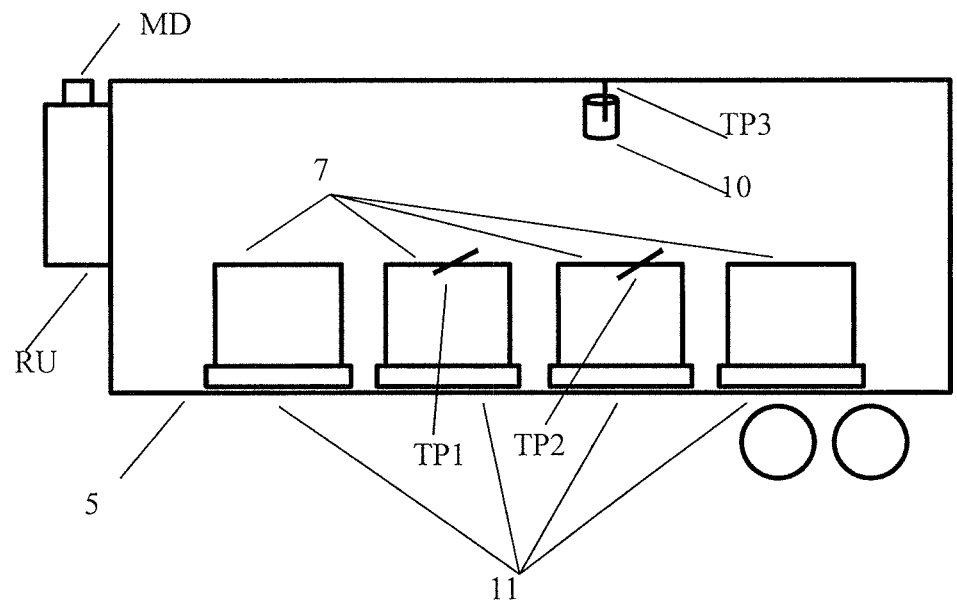
FIG. 1 is a pictorial schematic representation of a system for time-temperature monitoring of transportable goods, according to an embodiment.

FIG. 1 is a schematic representation of a system for time-temperature monitoring of transportable goods, according to an embodiment. A refrigerated asset (e.g., container, trailer, railcar, or truck) is represented by 5. It is equipped with a refrigeration unit RU1 which serves to keep the temperature within the refrigerated asset at a specified set point temperature via the use of controlling temperature sensors mounted within the asset. The asset is monitored via an intelligent monitoring device, represented by MD1, which may contain several sensors, including GPS, refrigeration asset fuel sensor, door sensor, etc., and may contain a communication system to deliver wireless information (e.g., via satellite, cellular, or short range data communication) to a database and network in real time. The intelligent monitoring device MD1 may be an electronic device, and may include a computing processor and memory. A communication path of the intelligent monitoring device MD1's communication system may be two-way, allowing commands and instructions to be remotely delivered to the intelligent monitoring device MD1. In the exemplary asset are several pallets 11 containing lading 7 whose temperature needs to be monitored. As illustrated in FIG. 1, two of the pallets 11 are equipped with temperature probes TP1 and TP2. These may transmit their readings to the intelligent monitoring device unit either via wireless short range communications or via wired harness. Alternatively, the temperature probes may include a data storage system that stores data and may include data memories which can be interrogated at a later date. Also shown in FIG. 1 is a wall-mounted temperature probe TP3. This too may be wired or wireless, or may contain data memory which can be interrogated at a later date. Probe TP3 is inserted into a vial of a material such as ethylene glycol 10 so as to better approximate the thermal response of the nearby pallets.

Figure 2:
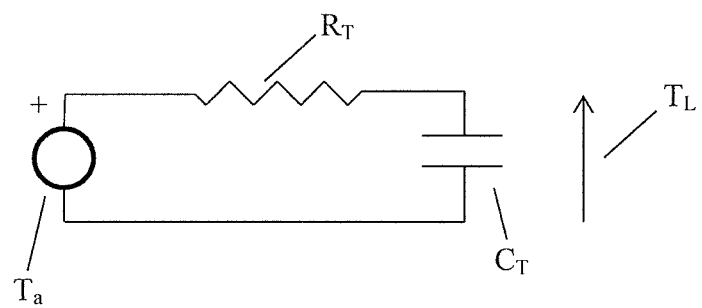
FIG. 2 is an electrical schematic circuit illustrating a simple system model of dynamics of temperature change of an object in response to a change in the air temperature constructed of cascading resistances and capacitances, according to an embodiment.

FIG. 2 illustrates a simple system model of dynamics of temperature change of an object in response to a change in the air temperature constructed of cascading resistances and capacitances, according to an embodiment. The dynamics of temperature change of an object in response to a change in the air temperature in which it is placed are governed by the object's thermal mass or capacity (e.g., Joules/Kelvin or Watt-seconds/Kelvin) and its thermal resistance (e.g., Kelvin/watt). A system may be modeled by its electrical analog as illustrated in FIG. 2, which yields the same differential equations. In such an electrical analog model, thermal mass is modeled by capacitance, thermal resistance is modeled by resistance, temperature is modeled by voltage, and heat flow is modeled by current.

As illustrated in FIG. 2., the ambient temperature is modeled by voltage source $T_a$; the thermal resistance by resistor $R_T$, the thermal mass by capacitor $C_T$. The temperature of the core is modeled by voltage $T_L$. More complex systems may be modeled by more complex configurations of the components shown. The system model constructed of cascading resistances and capacitances arranged as in FIG. 2 better simulates the response deep within a pallet. If the component values of FIG. 2 are known, then given the ambient temperature $T_a$ and the initial temperature at $T_L$, the dynamic temperature change at $T_L$ may be simulated. For a step change in ambient temperature $T_a$, the response at $T_L$ will follow an equation of the form in Eq. 1:

$$T = T_0 e^{-t/RC} \qquad (1)$$

where T is the temperature $T_L$ of the mass, $T_0$ is the ambient temperature, t is time, R is the thermal resistance $R_T$, and C is thermal mass $C_T$. This is the well-known solution to a first order differential equation.

In various embodiments, a thermal system within a refrigerated transportation asset, and external to the refrigerated transportation asset, may be modeled by a temperature probe equipped with a digital filter. There are a wide range of advantages of a wireless electronic temperature probe over a temperature probe immersed in ethylene glycol. First, there is higher accuracy relative to the type and quantity of commodity of a shipment, leading to significantly more accurate time-temperature monitoring performance. A given vial of ethylene glycol will at best approximate a single thermal system; with a digital filter, various parameters may be easily altered, both locally and remotely, to model the thermal characteristic of different types of commodities. Further, the amount of the commodity placed in the asset may also be taken into consideration regarding its thermal impact and time-temperature profile. In all of these embodiments, for instance, it is not necessary to stock a multitude of vials or temperature sensors to simulate the thermal impact of the commodity. Second, there is a relative ease of expansion. Whereas a given temperature probe can only be immersed in a single vial of ethylene glycol, multiple digital filters may be applied to a single temperature sensor, thereby simulating the response of numerous and varied loads. Third, complex systems may be easily modeled, giving for instance simulated dynamic responses of different positions within a single pallet. Finally, initial conditions may be easily inserted, allowing for simulation of the response of a pallet that enters the asset at an elevated temperature (known in the trade as a "hot load").

Figure 3:
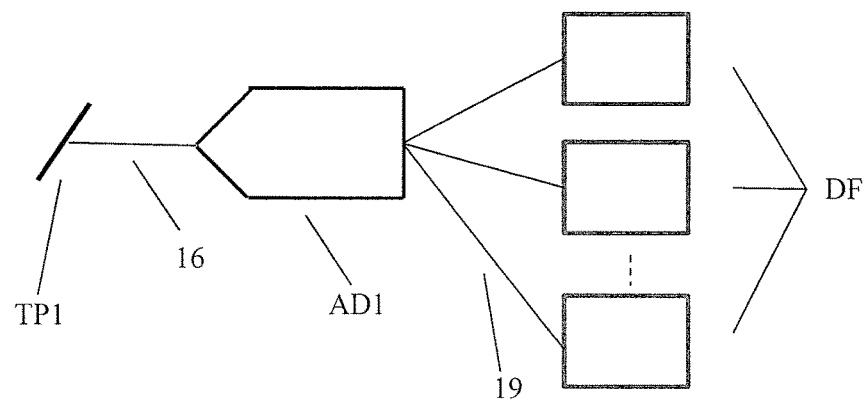
FIG. 3 is a block diagram illustrating a system for time-temperature monitoring of transportable goods using a temperature probe equipped with a digital filter, according to an embodiment.

FIG. 3 illustrates a system for time-temperature monitoring of transportable goods using a temperature probe equipped with a digital filter, according to an embodiment. The temperature probe is shown at TP1. This may be of any design, including but not limited to thermocouple, semiconductor or RTD. An analog to digital converter is shown at AD1, connected to the temperature probe by link 16. This may be a wired or wireless link. This should not be construed as limiting, as the A/D converter may be physically located with the temperature sensor. One or more digital filters are shown at DF, connected to the A/D converter by links 19, which may be wired or wireless.

Figure 4:
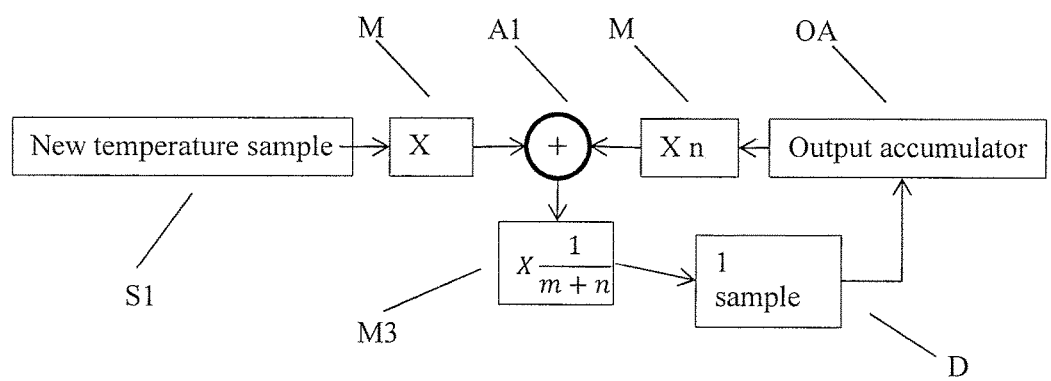
FIG. 4 is a block diagram illustrating a simple digital filter whose time response approximates that of the circuit shown in FIG. 2, according to an embodiment.

FIG. 4 illustrates a simple digital filter whose time response approximates that of the circuit shown in FIG. 2, according to an embodiment. In the exemplary implementation shown in FIG. 4, the new sample S1 is multiplied by a fixed constant m in multiplier M1. The current value of the output accumulator OA1 is multiplied by a fixed constant n. The two products are summed together in adder A1. The result is multiplied by the inverse of the sum of the two multiplicands m and n. This value becomes the new value of the output accumulator OA1. Delay D1 is inserted to ensure that the loop iterates once per sample period. In one exemplary implementation of this filter, m=1 and n=7. The exemplary filter simulates a resistor-capacitor network having a time constant of 8 times the sample rate. More complex networks may be modeled by any number of digital filter implementations that will be known to one skilled in the art.

Figure 5:
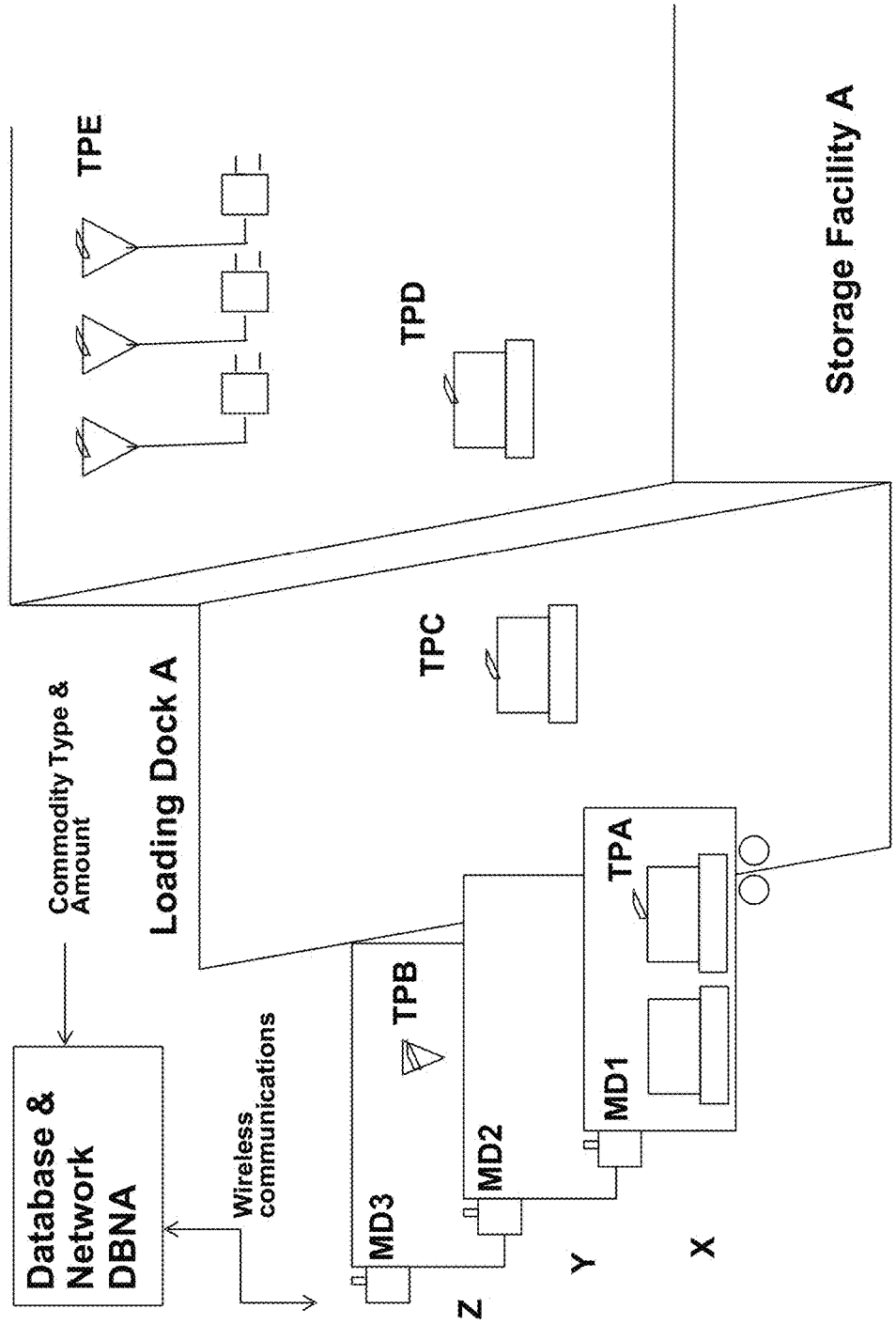
FIG. 5 is a block/pictorial diagram illustrating a general time-temperature monitoring system for a storage facility and refrigerated asset, according to an embodiment.

FIG. 5 illustrates a general time-temperature monitoring system for a storage facility and refrigerated asset, according to an embodiment. FIG. 5 shows a storage facility A, with a loading dock A, and three refrigerated assets (X, Y and Z). The concept of FIG. 5 illustrates food or drug commodities being removed from Storage Facility A and Loaded into Refrigerated Transport Assets for dispatch to multiple delivery locations, although FIG. 5 may be generalized to illustrate a commodity processor or commodity producer (as opposed to a storage facility). Further, FIG. 5 may be generalized to illustrate refrigerated assets making deliveries to an operator of the commodities, where the processes described herein may be performed in reverse order.

As illustrated in FIG. 5, the refrigerated assets are equipped with intelligent monitoring devices MD1, MD2, and MD3 which actively monitor activity and send and receive regular wireless communications to and from a Database and Network A. The intelligent monitoring devices are the principle method of delivering time-temperature monitoring data in real time to the network, so that instant or real-time corrective action may be taken for non-compliant conditions. The database and network also serves as the primary repository for shipment cycle data proving compliance or certification and responding to audits.

Within the facility and the refrigerated assets are wireless temperature probes with digital filters, TPA, TPB, TPC, TPD, and TPE, configured to monitor the core temperatures of the commodities and that monitor the commodities in various stages of shipment. The relationship of the wireless temperature probes to the commodities within the facility and refrigerated assets, and the refrigerated assets, allow for the overall objective of delivering accurate, real-time time-temperature monitoring data to the database and network to be achieved.

Wireless temperature probe TPA monitors the time-temperature of the pallets of commodities loaded into asset X. In one embodiment, wireless probe TPA is configured to simulate the commodities' thermal mass and resistance collectively within asset TPA. By virtue of the Database and Network DBNA that receives the facility's specific order information, to include the commodity types, volume (e.g., in terms of number of pallets, etc.), a remotely configurable digital filter setting is delivered via wireless communication from Database and Network DBA to Intelligent Device MD1. Intelligent Device MD1 is in wireless communications with Wireless Temperature probe TPA and changes its parameters to the proper conditions for the load. Thus, Wireless Temperature probe TPA within asset X may suitably deliver time-temperature monitoring data to the network in real time, for the duration of the shipment. Similarly, if an unloading condition at the delivery end of the shipment cycle were occurring, the wireless temperature probe would travel with the commodity pallet to retain time-temperature monitoring during the transition from the transportation asset to delivery into the facility.

Wireless temperature probe TPB is associated with refrigerated asset Z and intelligent device MD3 via local intelligence on the intelligent device MD3. The wireless temperature probe TPB has a rechargeable power source, and it may be recharged with refrigerated asset power supplied by the intelligent device MD3 as well as the refrigerated asset Z's power source. In this manner, the intelligent device MD3 and the temperature probe TPB establish a logical association to each other, and the probe TPB may be placed in a standard storage holder. The intelligent device MD3 is configurable so that in certain modes of operation, the temperature probe TPB may be installed in the refrigerated asset holder. In this mode, should empty or loaded transport of the asset Z occur without the probe, then the intelligent device MD3 will send an alarm notification to the database and network DBNA, which may instantly notify the proper operational personnel.

FIG. 5 also illustrates wireless temperature probe TPC, which is installed on a commodity within a pallet prepared for shipment. By virtue of a two-way wireless interface, the temperature probe TPC is in constant communication with intelligent wireless device MD2 mounted on refrigerated asset Y. By virtue of its communications linkage to Database and Network DBNA through intelligent device MD2, Temperature Probe TPC delivers time-temperature data to the network while constantly monitoring the temperature of the commodity.

By virtue of its two-way wireless connection to intelligent device MD2 and the Database & Network DBNA, Temperature Probe TPC may receive commodity time-temperature characteristics and the volume data of the commodity shipment from the Database & Network DBNA. Also by virtue of its two-way interface with intelligent device MD2, the Temperature Probe TPC may receive a corrected time stamp update based on the GPS sensor configured on intelligent device MD2, and the Temperature Probe TPC uses the revised time stamp to record time-temperature data on a continuous basis thereafter once it is no longer associated with intelligent device MD2. Thus, in one embodiment, the order for the commodity has recently been associated with refrigerated asset Y, meaning that the transportation segment of the commodity's delivery has been defined by the storage facility personnel.

Figure 7:
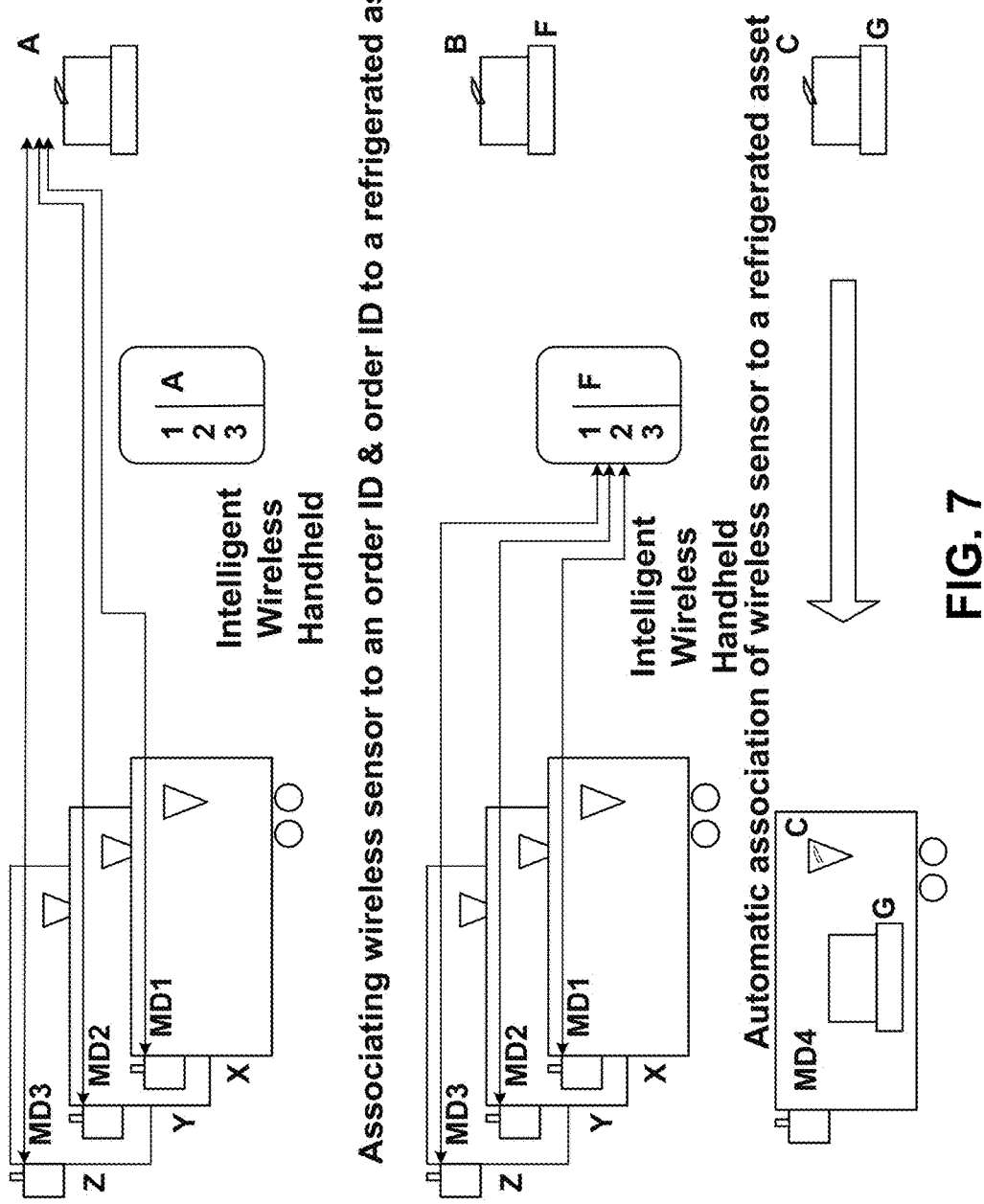
FIG. 7 is a pictorial diagram illustrating three conditions where a Wireless Temperature Sensor may be assigned to logical identifiers at early stages within the storage and transportation shipment cycle, according to an embodiment.

Once the order-asset association for the commodity is made, it may be transferred and/or stored in the Database & Network DBNA. Then, the commodity type temperature characteristics and volume may be delivered via wireless communications to the Temperature Probe TPC via intelligent device MD2. By virtue of the advantage for temperature probes and refrigerated assets to have interchangeable associations to maximize logistical flexibility, any number of refrigerated assets may interface to any number of wireless temperature sensors. Therefore, to accommodate the proper commodity in the shipment, wireless temperature sensors may be associated via intelligent devices to asset identification numbers. Methods of associating the wireless temperature probe to the proper intelligent device associated with specific refrigerated assets are illustrated in FIG. 7 and are discussed subsequently.

Figure 8:
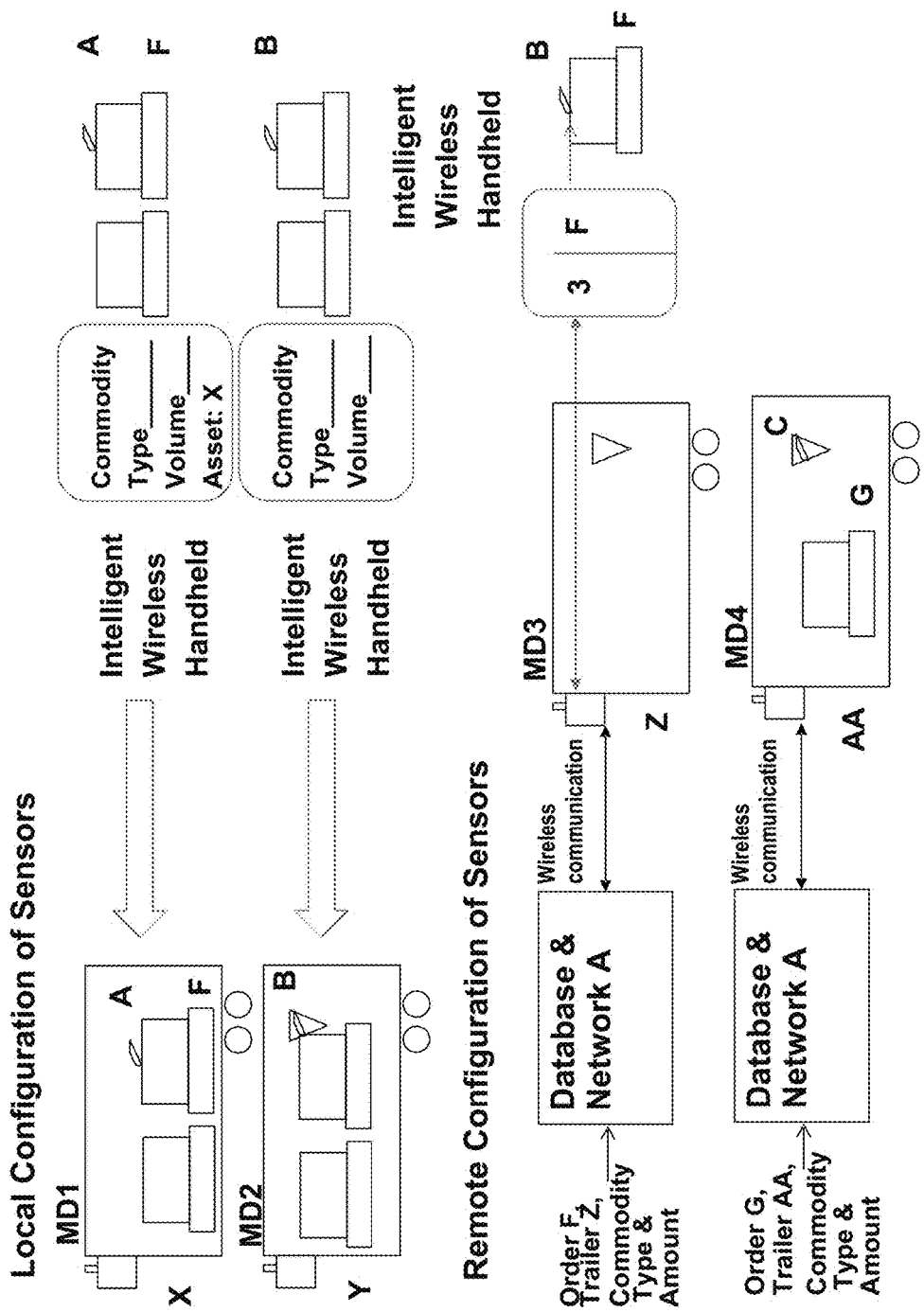
FIG. 8 is a pictorial diagram illustrating methods to locally or remotely configure wireless sensors for the type and volume of the commodity they are monitoring for time-temperature data.

In reference to FIG. 5, in another embodiment, workers on the loading dock have selected refrigerated asset Y for the shipment of the commodity. At this stage of the loading process, the workers would have access to specific order information associated with the commodity, and the commodity and packaging would be identified by various electronic tags and bar codes. The ability of the local operator or worker to configure into the Wireless Temperature Sensor the proper commodity temperature characteristics and volume via the use of bar codes and shipping information is illustrated in FIG. 8.

In reference to FIG. 5, wireless temperature sensor TPD is attached to a commodity within the processing area/storage area. Wireless temperature sensor TPD reads time-temperature data and stores the time-temperature data in its local memory. It is in a self-determined state of monitoring a specific commodity temperature, where the commodity is not associated with a transportation asset yet. The temperature sensor TPD has several avenues to communicate to the Database and Network DBNA via intelligent devices MD1, MD 2, or MD3, and the temperature sensor TPD may be placed in a mode to select any path available, but for illustrative purposes of the embodiment of FIG. 5, Temperature Sensor TPD is in a state where its programming has elected to store time-temperature data.

The objective of the storing of time-temperature data is so that once the commodity is associated to an order, or the commodity is assigned to be transported in a specific asset, then time-temperature data may be uploaded for the commodity via the properly selected intelligent device to provide a record of time-temperature data prior to the time of the commodity order or commodity asset assignment transaction. In this manner, when Temperature Sensor TPD is ultimately transitioned to a state similar to that of Temperature Sensor TPC, then the time-temperature data of the commodity is linked seamlessly in this transitional part of the shipment cycle. Shipment transition state assignments for the wireless Temperature Sensors are illustrated in FIG. 9 and discussed subsequently.

With respect to FIG. 5, several wireless Temperature Sensors TPE actively monitor time-temperature data in electrically powered recharging holders. The Wireless Temperature Sensors TPE are powered via rechargeable batteries, and while in fixed site locations, they may be recharged in specially configured fixtures that use electrical power to recharge the Sensor batteries. These power holders are electrically distinguishable from the electrical holders for the Wireless Sensor installed in the transportation assets (e.g., shown for Transportation Asset Z) and connected to intelligent devices. By virtue of their local knowledge of this recharging condition, the Wireless Temperature Sensors TPE record time-temperature data in real time and transmit the data in real time, along with their state condition illustrated in FIG. 9, to any available intelligent wireless device in the vicinity (e.g., mounted on transportation assets X, Y, or Z). Also, by virtue of their local knowledge of their charging conditions, the Wireless Temperature Sensors TPE have "canceled" any commodity temperature characteristic and volume data in their memory and actively monitor air temperature. In this manner, the Database and Network DBNA has real time knowledge of the time-temperature conditions in Storage Facility A.

FIG. 5 illustrates that a shipment system may be modeled and the time-temperature conditions may be measured for the transition of commodities from a fixed site temperature controlled facility to and from transportation assets accommodating both the thermal characteristic of the commodities and their respective quantity. Via this approach, wireless temperature sensors, locally knowledgeable of the thermal characteristics of commodities staged for shipment, may be configured via a number of methods suitable for the shipment, providing better representative commodity temperatures throughout the storage and transportation delivery cycle, and in particular during commodity transition conditions between facilities and refrigerated transportation assets. The embodiments include the features that the sensor design includes (1) specialized electrical circuitry that may measure core temperatures of commodities relative to air temperature, (2) storage and memory of time-temperature data within the sensor, (3) the ability of the wireless sensor to both transmit data and receive temperature configuration data and GPS time stamp data, and (4) local intelligence of the sensor to automatically determine its "state" within the shipment cycle.

The illustrated embodiments of FIG. 5 may utilize several additional functions and logic to provide real-time time-temperature data throughout the shipment cycle, including its transition areas. These include:

The Wireless Temperature Sensor may have the ability to associate/disassociate itself broadly and potentially indirectly to both shipment orders and transportation assets.

The association with transportation units may be performed by a linkage with a mounted wireless intelligent device with local knowledge of the transportation asset identifier.

The Temperature Sensor may transmit associated shipment order numbers to the Database & Network through wireless intelligent devices on any or a specific transportation asset.

The association/disassociation function is described in FIG. 7.

The Wireless Temperature Sensor may alter the configuration of its digital filter based on operator input functions that occur locally at the time of commodity order generation or at the time of order assignment to a refrigerated asset. Methods to identify commodity types and volumes associated with shipments are described in FIG. 8.

The Wireless Temperature Sensor may have the ability to self-assign shipment cycle "states" to conform to its condition and position within the storage, transportation and delivery shipment cycle as further described in FIG. 9.

Figure 6:
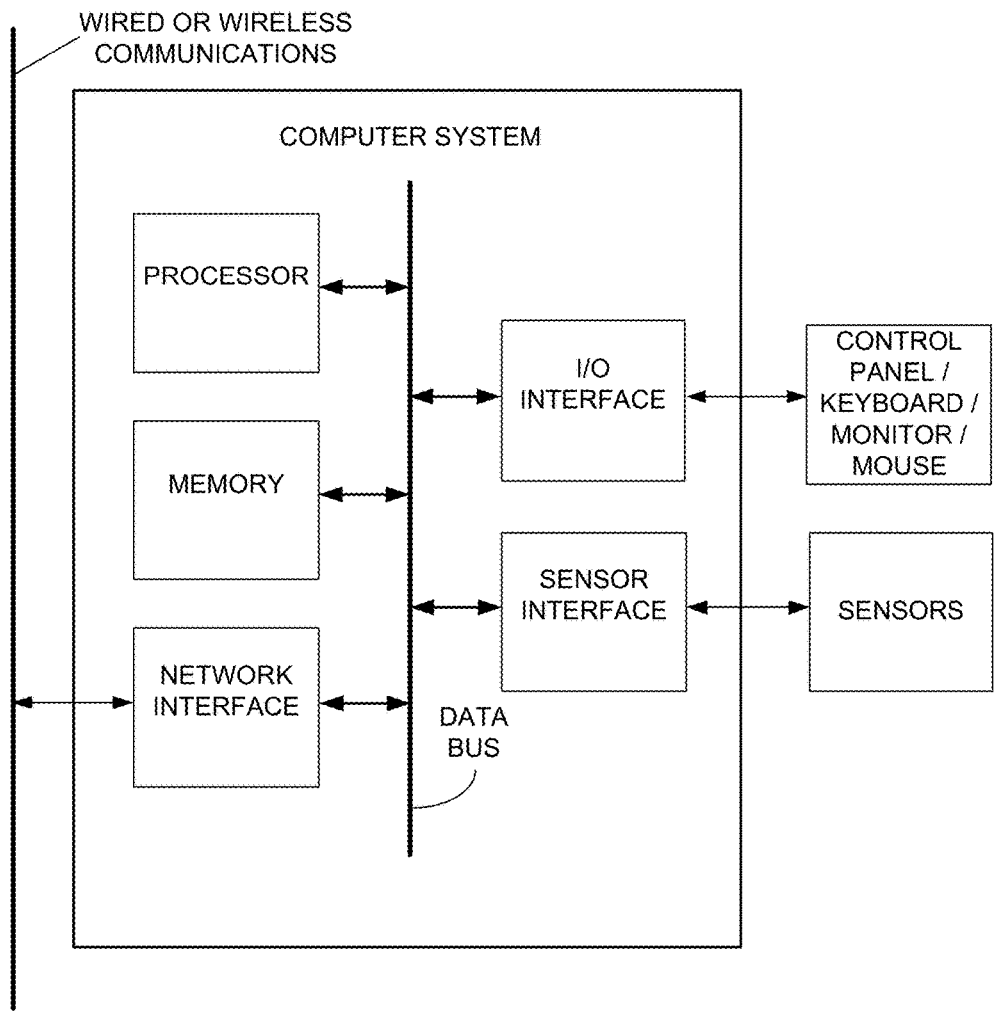
FIG. 6 is a block diagram illustrating a computer system of the Database and Network A of FIG. 5, according to an embodiment.

FIG. 6 illustrates a computer system of the Database and Network DBNA of FIG. 5, according to an embodiment. The computer system may receive input data remotely over wired or wireless communications or input from a user via the control panel/keyboard/monitor/mouse. The computer system may output information to the user regarding an operational status of the system using a display panel of the control panel or monitor, or remotely over the wired or wireless communications.

The computer system may include a processor that performs computations according to program instructions, a memory that stores the computing instructions and other data used or generated by the processor, and a network interface that includes data communications circuitry for interfacing to the wired or wireless communications. The wired or wireless communications may include an Ethernet network, asynchronous transfer mode (ATM) network, WiFi network, IEEE-488 interface bus, universal serial bus (USB), RS-232 serial interface, or other communication links and networks as known in the art. In addition, the network interface may include a network node of the wired or wireless communications or electronics configured to implement protocols of the wired or wireless communications. The processor may include a microprocessor, a Field Programmable Gate Array, an Application Specific Integrated Circuit, a custom Very Large Scale Integrated circuit chip, or other electronic circuitry that performs a control function. The processor may also include a state machine. The computer system may also include one or more electronic circuits and printed circuit boards. The processor, memory, and network interface may be coupled with one another using one or more data buses. The computer system may communicate with and control various sensors of the system via a control interface.

The computer system may be controlled by or communicate with a centralized computing system, such as one in a control center of a transportation system operator or manufacturer. The computer system may provide system monitoring, remote operation, and data transfer functions. The computer system may provide additional communications using an RS-232 communications interface and/or an infrared data port, such as communications with a personal computer (PC). Such additional communications may include real-time monitoring of temperature sensors, long-term data retrieval, and system software upgrades.

The computer system may poll the sensors at a minimum rate such that all time-temperature data required may be obtained by the computer system in time for real-time determination of deviations from pre-determined time-temperature specifications. The polled values may be reported by the computer system via the I/O interface and/or the network interface. The polled values may also be used in object temperature simulation algorithms by the computer system, and may be stored to long-term memory or a data storage medium for later retrieval and analysis.

FIG. 7 illustrates three conditions where a Wireless Temperature Sensor may be assigned to logical identifiers at early stages within the storage and transportation shipment cycle, according to an embodiment. In the first condition, a wireless temperature sensor identifier is assigned to a refrigerated transportation asset via the use of an intelligent device handheld. The intelligent device handhold may be a computing device having features, components, and characteristics similar to that illustrated in FIG. 6. In one embodiment, the wireless intelligent devices (MD1, MD2, and MD3) mounted on the refrigerated assets "seek" temperature sensor identifiers via short range wireless communications (A). Upon discovery or prompting from the intelligent handheld, the intelligent wireless devices transmit their transportation asset ID's (X, Y, and Z) along with the identifiers of temperature sensors (A) in range.

Software within the intelligent handheld provides an application which permits selecting the proper identified temperature sensor to the proper transportation asset. In a second embodiment, the wireless temperature sensor (A) "searches" for intelligent devices (MD1, MD2, and MD3) in range and delivers the available transportation assets (X, Y, and Z) to the intelligent handheld. An operator would then select the designated transportation asset for the identified wireless temperature sensor. In a modification to this condition, via the network or via self-determined means (e.g., duration and condition of refrigeration system on or off), intelligent devices (1, 2 and 3) would assign the refrigerated asset to which they are assigned (X, Y, or Z respectively) a "loaded" or "empty" state, and be available or non-available for selection. This would reduce the volume of traffic and confusion at crowded facilities.

FIG. 7 addresses a second condition, which may better accommodate the time lags between pulling and palletizing the commodity and assignment to a refrigerated asset. In this condition, the intelligent handheld may receive operator input and association of the wireless temperature sensor and order number (Order ID) of the shipment. The intelligent handheld would be configured to allow the operator to select a sensor from those in range (B) and assign it to an order associated with the commodity (F), which is input to the intelligent handheld via manual entry, bar code reading or equivalent or wirelessly if applicable. At a later time, when the commodity is to be loaded into a refrigerated asset, the intelligent handheld receives a wireless list of available assets via the intelligent devices mounted on them (X, Y, or Z) and the operator simply associates the proper order ID to the proper asset. Once the order assignment to the refrigerated asset is achieved, the wireless data connection between the sensor (B) and the asset mounted intelligent device is achieved, and the association, time-temperature reading and any stored time-temperature readings are delivered to the Database & Network, associated to both the refrigerated asset and the order number.

In the third condition, automatic association of the wireless sensor to a refrigerated asset is illustrated without the aid of an intelligent handheld. This third condition illustrates a temperature sensor C installed for some period of time on a commodity for order ID G. In this case, no intelligent handheld is present and the facility is too crowded with either wireless sensors or intelligent devices in order to make an automatic assignment. In this case, the placement of the wireless sensor in a rechargeable fixture within the refrigerated asset allows for an automatic association to be achieved. The rechargeable fixture has interconnectivity to intelligent device MD4. When the wireless sensor is placed in the fixture, the association between the wireless sensor and the refrigerated asset is completed, allowing for wireless transmission of all historical time-temperature data to the network. Because any pre-set or pre-configured commodity and volume parameters are established on sensor C, placement of the temperature sensor away from the commodity may be safely made without affecting time-temperature data as any susceptibility of the sensor to air temperature is buffered due to its parameter settings.

After a shipment is delivered (the transportation segment is completed), disassociation of the asset and the sensor may be performed. The following are several conditions that may trigger the refrigerated asset and temperature sensor to be automatically disassociated:

The refrigeration unit is switched off.
The refrigeration unit is switched off and has entered a specific location entered into the memory of the intelligent device.
The wireless temperature device is removed from its asset mounted recharging fixture after a settable time period from the commodity loading event or when it was automatically assigned.
The wireless temperature device is removed from it recharging fixture and the distance between the intelligent device and the temperature sensor is so great as to have the wireless connection broken.

After an order is delivered, disassociation of the order and the sensor may be performed. The following are several conditions that may trigger the order and the temperature sensor to be automatically disassociated:

The wireless sensor is removed from its asset mounted rechargeable fixture.

The wireless sensor detects that it has been inserted into a facility mounted rechargeable fixture.

The wireless temperature device is removed from it recharging fixture and the distance between the associated intelligent device and the temperature sensor is so great as to have the wireless connection broken.

FIG. 8 illustrates methods to locally or remotely configure wireless sensors for the type and volume of the commodity they are monitoring for time-temperature data. Regarding the local condition, local operators may configure the sensor with the aid of a wireless intelligent handheld, which may receive commodity type and volume data via:

Barcodes identifying the commodity attached or associated to the commodity or pallet.

Order numbers associated with the commodity.

A local database accessible to the operator and or handheld via wireless communications.

Within the handheld, a software program facilitates the association of commodity types and volume to create and deliver the proper filter parameters to a selected temperature sensor. In this manner, the time-temperature data is adjusted for the commodity's core temperature with respect to its environment. In the first local embodiment illustrated in FIG. 8, the refrigerated asset X, via wireless device MD1, is associated to the sensor A or order F under the first or second conditions of FIG. 7. In the second local embodiment illustrated in FIG. 8, temperature sensor B is configured locally via the operator interface with the intelligent handheld and assigned to refrigerated asset Y via intelligent device MD2 upon placement of the asset-based rechargeable fixture. In a third embodiment, the commodity temperature characteristics are "averaged" for the facility and simulated product temperatures are provided by default parameters. This is electronically similar to providing a temperature sensor in an ethylene glycol solution, adjusted for different facilities.

Regarding FIG. 8 and remote methods of configuration of the sensor, order number and commodity type and volume are identified and delivered to a database and network, which automatically delivers the proper commodity parameters to the proper sensor via the intelligent device and order assignment configured via a hand held per FIG. 7. In this case, an order ID F associated to a refrigerated asset Z is delivered to intelligent device 3 mounted on asset Z. Via communications to local handheld devices, the order association F is found to the intelligent device MD3. Via the local handheld, the temperature sensor ID B is identified. Association to intelligent device MD3 is completed and remote download of parameters to the temperature sensor is initiated.

In another remote configuration for the setting of parameters to the sensors, the order and asset ID are delivered to Database & Network DBNA, which are remotely delivered via the intelligent device to a temperature sensor inserted or subsequent to the insertion into the rechargeable fixture. In reference to FIG. 8, Order L and transportation asset AA provide the location and commodity type and volume to Database & Network DBNA, which delivers the configuration information to Temperature Sensor C via intelligent wireless device MD4.

Overall, FIG. 8 illustrates a method for workers loading the asset with commodities to utilize bar code readers associated with the commodities and their quantities to wirelessly configure the "temperature sensor/digital filter". In a remote configuration method, the order manifest of the order for the transportation asset, containing commodity types and quantities may be received by the wireless network and remotely delivered to the intelligent device, which in turn, configures the temperature sensor/digital filter suitably for the shipment. An important implication of this concept is that associated with the commodity core temperatures, commodity prescribed set point temperatures and specific temperature thresholds may be applied to the sensor. In this manner, the Temperature Sensor may record in real time the amount of time a commodity has exceeded a specific temperature harmful to the commodity and also record the time throughout a shipment of the time above a secondary higher threshold. This makes the calculation and detection of food safety problems readily available.

FIG. 9 illustrates sequential shipment cycle "states" for temperature controlled commodities within the storage, transportation and delivery segment, according to an embodiment. During the shipment cycle, the Wireless Temperature Sensor has the ability to "self-assign" shipment cycle states that conform to storage, transportation, delivery and transition activities. These "self-assigned" states are called "temperature states." The objective is to provide temperature visibility end-to-end through all states in real-time so that temperature quality may be assessed instantly at any part of the process with an easily retrievable data record and assigned accountability to parties responsible for each area of the shipment cycle. Logic within the wireless device also facilitates the initiation and termination of the shipment cycle for a commodity or palletized commodity. Further, the shipment cycle states are not necessarily in sequential order as, particularly with refrigeration assets which support multiple temperature zones, multiple loadings and deliveries of commodities may be made from the same transportation asset.

Figure 10:
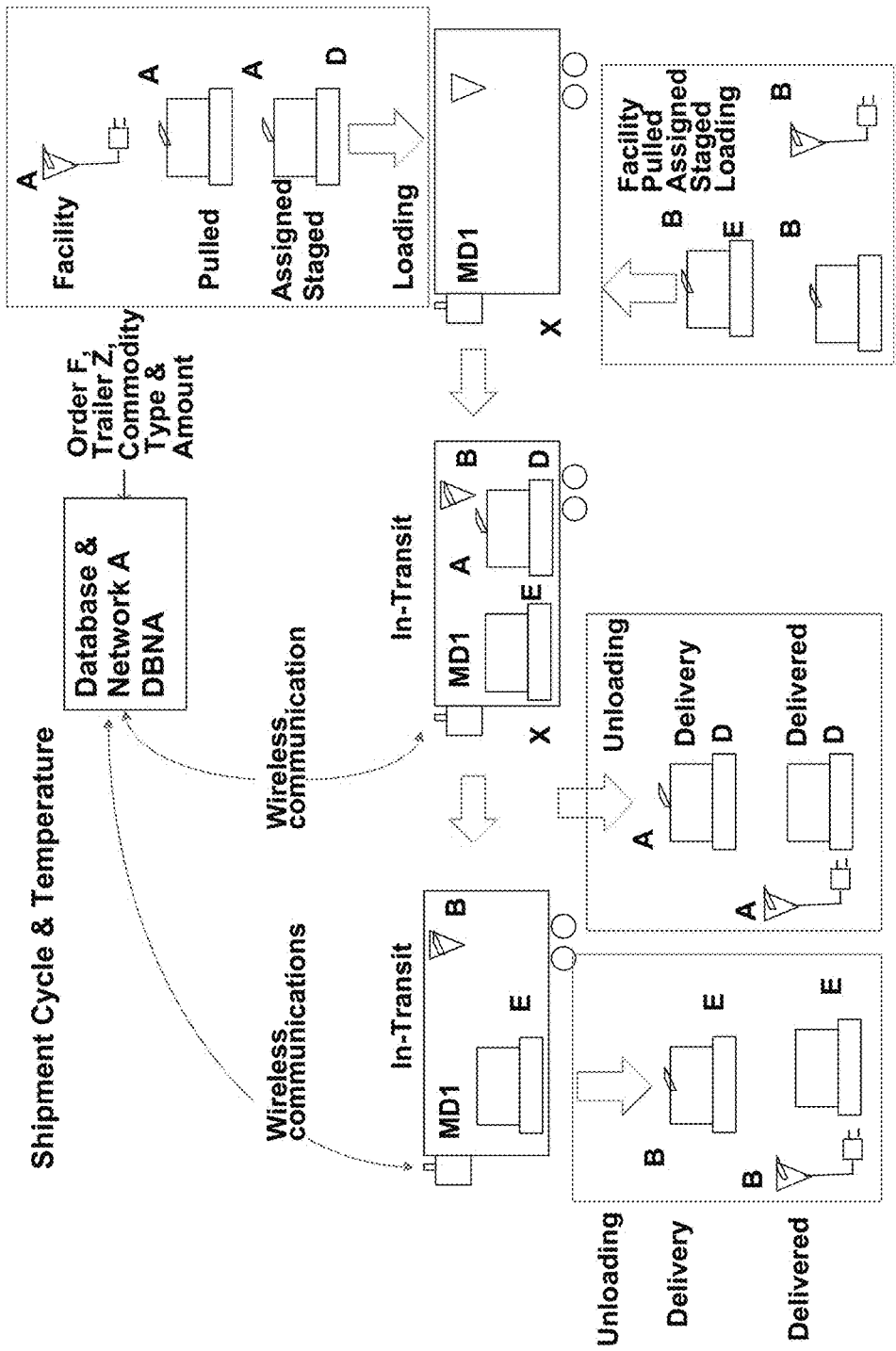
FIG. 10 is a pictorial diagram illustrating an exemplary embodiment in which the logic within the temperature sensor, intelligent devices, database & network and order/commodity planning information operate in concert to automatically "self-assign" states locally and in the network to all areas of the shipment cycle.

FIG. 10 illustrates an exemplary embodiment in which the logic within the temperature sensor, intelligent devices, database & network and order/commodity planning information operate in concert to automatically "self-assign" states locally and in the network to all areas of the shipment cycle. The exemplary embodiment uses source information available from multiple sensors simultaneously as well as order and commodity/volume transactions to properly locally "self-assign" temperature states during the shipment cycle.

Temperature sensors A and B are powered by fixed site fixtures associated with separate production, processing or storage facilities. At some point prior to the initiation of a shipment cycle, intelligent device MD1 mounted on transportation asset X is in the proximity of each of the storage facilities of A and B. By virtue of short range wireless communications, A and B deliver time-temperature data (both real time and stored) to 1, which communicates the data to Database & Network DBNA. The GPS proximity of intelligent device 1 and advance logic applied to it, such as a GPS-based geofence, permits the device and network to identify the facilities. This activity could be accomplished by any number of asset mounted devices installed in the vicinity of A & B.

At some point in time, A and B are removed from their fixtures and applied to a commodity or pallet being prepared for shipment, and their time-temperature recording is time stamped to initiate a shipment (Pulled State). Eventually, the pallet is identified with an order number (D or E respectively), and the Database & Network DBNA may have access to the order number, the commodity, its shipment volume, its origin and destination locations, responsible party, and other planning elements of the shipment. Thereafter, the Database & Network A may be able to make an association regarding an order and staged pallet at each facility, and via wireless communications through intelligent device MD1, A and/or B may be transitioned to an Ordered state via MD1. Concurrently, before, or after the order assignment, a pallet or order may be assigned to refrigerated asset X and transferred to Database & Network DBNA. Either locally or remotely, intelligent device MD1 and A and B are assigned to one another, and Temperature Sensors A & B are transitioned to a "Staged" State.

At loading, through the transit process and unloading phase, the sensors within the intelligent device may be utilized to clarify the loading, in-transit and unloading state of Temperature Sensors A & B. For instance, the presence of a Loading geofence within the logic of the intelligent device may allow the Temperature Sensor A or B to be transitioned to a Loading State. Further, specific sensing technology of the Temperature Sensor when it is in the refrigerated asset may allow an automatic transition to Loading State. When the Temperature Sensor is placed in the intelligent device mounting fixture, the Temperature Probe B may automatically transition to a Loading State, and when the doors are closed (triggering door sensors) or when the asset moves out of the loading geofence, the Temperature Sensor State may transition to "In-Transit." Again, it is relevant during these transitional stages to assure that the time-temperature readings are adjusted for the commodity type and volume, as the transition may cause the commodity to be exposed to non-refrigerated conditions for an acceptable or unacceptable time frame.

During the in-transit segment of the shipment, the time-temperature information is regularly recorded and delivered to the Database and Network for all Temperature Sensors within the shipment (both Temperature Sensors A and B in this instance). These may be Sensors exposed to the same refrigerated asset set point temperatures or may be applicable to multi-compartment units with different set point temperatures. Most importantly, commodity set point and threshold temperatures may be applied to the commodity via the Database & Network suitable for orders E and F and delivered to the Temperature Sensor. Thus, the Temperature Sensors may record and deliver the time-temperature exposure above or below specific thresholds making food safety conditions visible, or provide insight to induced shelf life problems.

As the refrigerated transportation asset makes multiple deliveries, as in the case of FIG. 10, unloading activities may be detected by the intelligent device causing the Temperature Sensor to transition to an unloading state. This may occur when the asset door is open, may be designated by an unloading geofence within the memory of the intelligent device, or the Temperature Sensor is removed from within the interior of the asset and the intelligent device recognizes it. In FIG. 10, it is relevant to recognize that the Temperature state for commodities/sensors that remain with the asset in the transportation cycle, such as Temperature Sensor B, which is applied to order E, transition to an unloading state, as Order D with Temperature Sensor A, is removed from the asset. This state change allows for the effects of loading and unloading transitions to be monitored by the temperature sensors in real time, possibly providing sources of improper temperature control. Once the appropriate sensors trigger that Temperature Sensor A has been removed and Temperature Sensor B remains with the refrigerated transportation asset, B's transition state is reverted back to "in-transit."

Once intelligent device recognizes that the transportation asset has resumed its shipment or is unloaded via internal sensor, geofence, refrigeration unit off, or some combination thereof, it sends a notification to Temperature Sensor A that its delivery state should transition from "unloading" to "delivery." The delivery state remains with the commodity, as Temperature sensor A reads time-temperature data throughout and delivers data via intelligent device MD1 or some other intelligent device in the proximity. As the commodity is delivered into the operational facility for use, Temperature Sensor A is placed in a rechargeable station, and the state is transitioned to "Delivered." Further, Temperature Sensor A terminates the shipment state, and any commodity type or volume parameters suitable for the journey are cancelled to read time-temperature of ambient air. At a different location, Temperature Sensor B is transitioned from an "in-transit" state to "unloading", "delivery" and "delivered" state in a similar fashion.

The time-temperature profile provided by Temperature Sensors integrated with intelligent devices on refrigerated transportation equipment provides advantages not available with prior systems. Significant transition periods occur between refrigerated facilities and refrigerated assets, which often expose food and drugs to unsuitable temperatures. The automatic state transitions of the Temperature Sensors allow time-temperature monitoring in real time throughout every phase of the shipment cycle to identify the exposure to unsuitable temperatures as they occur. Further, system flexibility allows the temperature sensors to be automatically configured to monitor core commodity temperatures based on standard type and volume characteristics. Additionally, standard expected set point temperature ranges may be applied to sensors based on the type of commodity or the shipment order. Threshold ranges may be established to allow the wireless temperature sensors to measure the time-temperature exposure of the commodity to unspecified or dangerous temperature levels. With a real-time system using wireless temperature sensors with distributed logic applied to wireless intelligent devices mounted on refrigerated transportation assets, time-temperature data is provided in real time in suitable formats to avoid spoilage, extend shelf life and eliminate food and drug safety issues. These benefits are also available for other goods in any stage of the value chain, for example from sourcing of raw materials, to manufacturing, to storage, to distribution, to retail sales, and to consumption and operation.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention. In the description of the embodiments, certain detailed explanations of related art are omitted when it is deemed that they may unnecessarily obscure the essence of the invention.

The system described herein may comprise a controller including a processor, a memory for storing program data to be executed by the processor, a permanent storage such as a disk drive, a communications port for handling communications with external devices, and user interface devices, including a display, touch panel, keys, buttons, etc. When software modules are involved, these software modules may be stored as program instructions or computer readable code executable by the processor on a non-transitory computer-readable media such as magnetic storage media (e.g., magnetic tapes, hard disks, floppy disks), optical recording media (e.g., CD-ROMs, Digital Versatile Discs (DVDs), etc.), and solid state memory (e.g., random-access memory (RAM), read-only memory (ROM), static random-access memory (SRAM), electrically erasable programmable read-only memory (EEPROM), flash memory, thumb drives, etc.). The computer readable recording media may also be distributed over network coupled computer systems so that the computer readable code is stored and executed in a distributed fashion. This computer readable recording media may be read by the computer, stored in the memory, and executed by the processor.

Also, using the disclosure herein, programmers of ordinary skill in the art to which the invention pertains may easily implement functional programs, codes, and code segments for making and using the invention.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements, the invention may be implemented with any programming or scripting language such as C, C++, JAVA®, assembler, or the like, with the various algorithms being implemented with any combination of data structures, objects, processes, routines or other programming elements. Functional aspects may be implemented in algorithms that execute on one or more processors. Furthermore, the invention may employ any number of conventional techniques for electronics configuration, signal processing and/or control, data processing and the like. Finally, the steps of all methods described herein may be performed in any suitable order unless otherwise indicated herein or otherwise clearly contradicted by context.

For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. The words "mechanism", "element", "unit", "structure", "means", and "construction" are used broadly and are not limited to mechanical or physical embodiments, but may include software routines in conjunction with processors, etc.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

TABLE OF REFERENCE CHARACTERS 5 refrigerated asset (e.g., container, trailer, railcar, or truck)
7 lading
10 ethylene glycol
11 pallets
16 link
19 link
A loading dock, storage facility
A1 adder
AD1 A/D converter
D1 delay
DBNA database and network
M1 multiplier
MD1 intelligent monitoring device
OA1 output accumulator
RU1 refrigeration unit
S1 sample
TPx temperature probe/temperature sensor
X, Y, refrigerated assets
Z

We claim:
1. A method of monitoring a time-temperature profile comprising:
    measuring by a temperature sensor a temperature of a transportable good;
    communicating the temperature to an electronic device via wired or wireless connection;
    recording by the electronic device a time-temperature data point including the temperature and a time at which the temperature was measured;
    communicating the recorded time-temperature data point by the electronic device to a computing system by wired or wireless connection; and determining by the computing system whether the recorded time-temperature data point is outside a predetermined acceptable range;

wherein the electronic device is separate from the computing system, and wherein the electronic device is capable of real-time monitoring of a time-temperature during storage and during transportation of the transportable good;

wherein the determining comprises filtering the recorded time-temperature data point using a digital filter configured to simulate temperature or temperature change of the transportable good in response to change in air temperature in which the transportable good is situated according to the transportable good's thermal mass or capacity and the transportable good's thermal resistance.

2. The method of claim 1, wherein the temperature sensor comprises a digital filter that filters the temperature measurement, and wherein the measuring comprises filtering the temperature data point using the digital filter configured to simulate dynamics of temperature change of the transportable good in response to change in air temperature in which the transportable good is situated according to the transportable good's thermal mass or capacity and the transportable good's thermal resistance.

3. The method of claim 1, wherein the electronic device wirelessly communicates in real time with the computing system.

4. A system for monitoring a time-temperature profile comprising:
   a temperature sensor that measures a temperature of a transportable good and communicates the temperature by wired or wireless connection;
   an electronic device that receives the temperature from the temperature sensor and records a time-temperature data point including the temperature and a time at which the temperature was measured;
   a communication interface that transmits the recorded time-temperature data, point by wired or wireless connection from the electronic device; and
   a computing system that receives the recorded time-temperature data point transmitted from the electronic device and determines whether the recorded time-temperature data point is outside a predetermined acceptable range;
   wherein the electronic device is separate from the computing system, and wherein the electronic device is capable of real-time monitoring of a time-temperature during storage and during transportation of the transportable good;
   wherein the computing system further filters the recorded time-temperature data point using a digital filter configured to simulate temperature or temperature change of the transportable good in response to change in air temperature in which the transportable good is situated according to the transportable good's thermal mass or capacity and the transportable good's thermal resistance.

5. The system of claim 4, wherein the temperature sensor comprises a digital filter that filters the temperature measurement, the digital filter configured to simulate dynamics of temperature change of the transportable good in response to change in air temperature in which the transportable good is situated according to the transportable good's thermal mass or capacity and the transportable good's thermal resistance.

6. A non-transitory computer-readable storage medium having stored thereon a program executable by a computer processor for performing a method of monitoring a time-temperature profile, the method comprising:
   measuring by a temperature sensor a temperature of a transportable good;
   communicating the temperature to an electronic device via wired or wireless connection;
   recording by the electronic device a time-temperature data point including the temperature and a time at which the temperature was measured;
   communicating the recorded time-temperature data point by the electronic device to a computing system-by wired or wireless connection; and
   determining by the computing system whether the recorded time-temperature data point is outside a predetermined acceptable range;
   wherein the electronic device is separate from the computing system, and wherein the electronic device is capable of real-time monitoring of a time-temperature during storage and during transportation of the transportable good;
   wherein the determining comprises filtering the recorded time-temperature data point using a digital filter configured to simulate temperature or temperature change of the transportable good in response to change in air temperature in which the transportable good is situated according to the transportable good's thermal mass or capacity and the transportable good's thermal resistance.

7. The non-transitory computer-readable storage medium of claim 6, wherein the temperature sensor comprises a digital filter that filters the temperature measurement, and wherein the measuring comprises filtering the temperature data point using the digital filter configured to simulate dynamics of temperature change of the transportable good in response to change in air temperature in which the transportable good is situated according to the transportable good's thermal mass or capacity and the transportable good's thermal resistance.

* * * * *